United States Patent [19]
Matsuno et al.

[11] Patent Number: 5,234,717
[45] Date of Patent: Aug. 10, 1993

[54] PROCESS FOR PRODUCING A MINUTE-PATTERNED SUBSTRATE

[75] Inventors: Yoshihiro Matsuno; Atsunori Matsuda; Shinya Katayama, all of Tsukuba, Japan

[73] Assignee: Nippon Sheet Glass Co., Ltd., Osaka, Japan

[21] Appl. No.: 963,035

[22] Filed: Oct. 19, 1992

Related U.S. Application Data

[63] Continuation of Ser. No. 713,799, Jun. 12, 1991, abandoned.

[30] Foreign Application Priority Data

Jun. 14, 1990 [JP] Japan .................. 2-156482

[51] Int. Cl.$^5$ .............................................. B05D 5/00
[52] U.S. Cl. ........................... 427/277; 427/162; 427/278; 427/294; 427/359; 427/385.5
[58] Field of Search ............... 427/162, 164, 165, 294, 427/296, 385.5, 355, 277, 278, 258, 359, 370, 371

[56] References Cited

U.S. PATENT DOCUMENTS

| | | | |
|---|---|---|---|
| 3,788,872 | 1/1974 | Sigman | 427/278 |
| 4,250,021 | 2/1981 | Greenaway | 427/162 |
| 4,382,103 | 5/1983 | McQuaid | 427/162 |
| 4,931,313 | 6/1990 | Arakawa et al. | 427/162 |
| 5,053,252 | 10/1991 | Kimura et al. | 427/278 |

FOREIGN PATENT DOCUMENTS 62-102445  5/1987  Japan .
1-119545  5/1989  Japan .

Primary Examiner—Janyce Bell
Attorney, Agent, or Firm—Woodcock Washburn Kurtz Mackiewicz & Norris

[57] ABSTRACT

Disclosed herein is a process for producing a minute-patterned substrate required for optical disk substrates for information recording or the like, which process comprises forming a coating film of a solution containing a metal-organic compound and a thickener on a substrate, pressing a mold against the coating film on the substrate under a reduced pressure and heating the coating film to set up the coating film, then removing the mold, and heating the set coating film on the substrate. By the process it is possible to provide the substrate surface with a minute rough pattern, without generation of surface defects arising from the pressing of the mold against the coating film, and to set up the coating film in a short time and with good dimensional accuracy. It is therefore possible to produce a rough surface pattern with high productivity.

6 Claims, 3 Drawing Sheets

5,234,717

PROCESS FOR PRODUCING A MINUTE-PATTERNED SUBSTRATE

This is a continuation of application Ser. No. 713,799, filed Jun. 12, 1991, now abandoned.

BACKGROUND OF THE INVENTION

1. Field of the Invention

The present invention relates to a process for producing a minute-patterned substrate, and more particularly to a process for producing a minute-patterned substrate suitable for use as a grooved substrate for optical disk, a diffraction grating or the like.

2. Description of the Prior Art

There has been known a process for producing a grooved substrate in which a plastic coating film is formed on a substrate from a solution containing a metal-organic compound, then a mold is pressed against the coating film to provide the coating film with a groove pattern corresponding to a ridge shape of the mold, and the coating film is hardened by baking (Japanese Patent Application Laid-Open (KOKAI) Nos. 62-102445 (1987) and 1-119545 (1989)).

The process disclosed in the Japanese Patent Application Laid-Open (KOKAI) No. 62-102445 (1987) has the merit that a grooved substrate for use as an optical disk substrate for information recording can be manufactured comparatively easily. According to this process, however, the setup of the coating film with the mold pressed against the surface of the film is carried out in the atmospheric air and, accordingly, large bubbles may penetrate to the interface between the mold and the coating film, producing hollows in the surface of the coating film. Upon hardening of the film, therefore, the surface of the film may have a large number of hollows. In order to solve this problem, the process disclosed in the Japanese Patent Application Laid-Open (KOKAI) No. 1-119545 (1989) employs a solution containing a thickener in addition to a metal-organic compound as a coating solution, which is applied to a substrate to form a coating film, and a mold is pressed against the coating film under a reduced pressure. Although the latter process prevents large-sized bubbles from being confined between the substrate surface and the mold, minute bubbles on the submicron order may be confined instead. This process therefore has difficulties in producing a substrate which is required to have high surface quality, such as an optical disk substrate. In addition, the process has a disadvantage on an operational basis in that it takes long time to set up the coating film with pressing.

OBJECTS AND SUMMARY OF THE INVENTION

The present invention contemplates a solution to the aforementioned problems involved in the prior art.

It is accordingly an object of the present invention to provide a process for providing a substrate with a minute pattern in a short time, without generating hollows on the submicron order in size in the substrate surface.

The above, and other, objects, features and advantages of the present invention, will become readily apparent from the following detailed description thereof which is to be read in which the same or corresponding parts are identified by the same reference numerals in the several views.

DETAILED DESCRIPTION OF A PREFERRED EMBODIMENT

Figure 1:
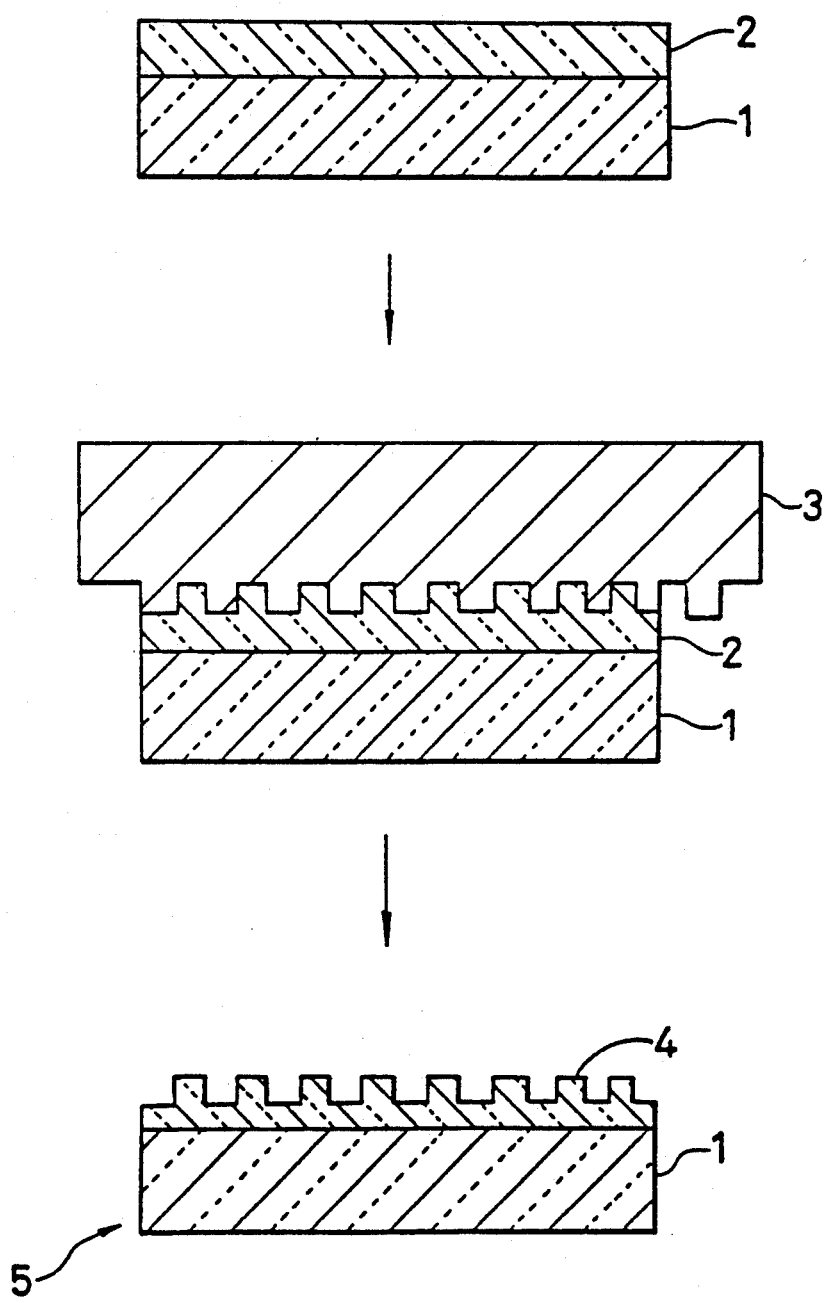
FIG. 1 is a schematic illustration of a procedure for carrying out the present invention.

According to the present invention, there is provided a process for producing a minute-patterned substrate which comprises the steps of forming a coating film of a solution containing a metal-organic compound and a thickener on a substrate, then pressing a mold against the coating film on the substrate in an atmosphere of a pressure of 0.0133 pa or below and heating the coating film to a temperature of from 40° to 250° C. to set up the coating film into a film having a recessed pattern corresponding to a projected pattern of the mold, subsequently separating the mold from the coating film thus set up, and baking the set coating film on the substrate at a temperature of 300° C. or above.

In the present invention, the pressure of the atmosphere in which the mold is pressed against the coating film on the substrate should be 0.0133 pa (pascal) or below. With the pressure of the atmosphere adjusted to or below 0.0133 Pa, the size of defects (or irregularities) produced in the rough surface pattern by residual gases can be reduced to or below a value of 0.1 to 0.2 μm, which is allowable for optical disk substrates for information recording. It is preferable that the pressure of the atmosphere in which the mold is pressed against the coating film be controlled to or below a further lower value of 0.00133 Pa, whereby the size of the surface defects arising from the residual gases can be reduced to or below 0.05 μm. If the pressure of the atmosphere upon carrying out the pressing is in the range from 0.0133 to 0.133 pa, the defects in the rough surface pattern due to the residual gases will be from 0.3 to 1 μm in size. Such a defect size, 0.3 to 1 μm, is close to the size of the beam spot used generally for reading or writing records, 0.8 μm, and would cause errors.

The coating solution contains a metal-organic compound and a thickener. When the coating film obtained by application of the coating solution to the surface of a substrate is placed in an atmosphere at a pressure of 0.0133 Pa or below and room temperature, the reaction rate of hydrolysis and polycondensation of the metal-organic compound is low. According to the present invention, therefore, the pressing of the mold against the coating film at a pressure of 0.0133 Pa or below is carried out, and subsequent thereto, while the mold is still being pressed against the coating film at a pressure of 0.0133 Pa or below, heating is carried out to a temperature of from 40° to 250° C., preferably from 40° to 20° C., most preferably from 60° to 100° C., in order to set up the coating film speedily. The temperature attained by the heating is up to 150° C., at maximum, when the mold is made of plastic. When a glass mold is used, the upper limit of the temperature is 250° C., above which a thickener will be carbonized due to deficiency of oxygen because the pressing with heating is carried out in a reduced-pressure atmosphere. By the heating according to the invention, the coating film can be molded with good dimensional accuracy in a short time. The heating temperature in setting up the coating film can be determined optimally within the aforementioned range, in connection with the amount of the thickener contained in the coating solution.

In an embodiment of the present invention, the mold is pressed against the coating at reduced pressure without heating, and subsequently, in the pressed condition, the coating is heated. The pressing is thus carried out in a state whereby the metal-organic compound contained in the coating solution is not polymerized by hydrolysis. The subsequent heating step is carried out to rapidly solidify the coating film, thereby obtaining a rough pattern with good dimensional accuracy in a short time.

After the coating film is set up at the comparatively low temperature as mentioned above, the mold is separated from the set film on the substrate. Then, for substantially complete removal of organic components from the coating film, the set film is baked at a temperature which is not lower than 300° C. and at which the substrate is not deteriorated by heating. Generally, the baking at the higher temperature is carried out in the atmospheric air. In some cases, however, the baking may be performed in a reduced-pressure atmosphere, subsequently to the heating at the lower temperature.

The metal-organic compound for use in the process of the present invention may be any of those compounds which are capable of increasing the viscosity of the coating solution through polycondensation or cross-linking to form a film on the substrate.

The metal-organic compounds usable in the present invention include, for example, metal alcoholates which have the formula $M(OR)_n$, wherein M is an element such as Si, Ti, Zr, Ca, Al, Na, Pb, B, Sn, Ge, etc., R is an alkyl group such as methyl, ethyl, etc., and n is an integer of from 1 to 4, and which are conventionally used in the so-called sol-gel process, such as $Si(OCH_3)_4$, $Si(OC_2H_5)_4$, $Ti(OC_3H_7)_4$, $Zr(OC_4H_9)_4$, $Zr(OC_3H_7)_4$, $Al(OC_4H_9)_3$, $Al(OC_3H_7)_3$, $NaOC_2H_5$, etc.; chelate complexes; and metal-organic compounds which contain a known functional group capable of polycondensation or cross-linking, such as —Cl or other halogen, —COOH (carboxyl group), —COOR (ester group), —NH₂ (amino group),

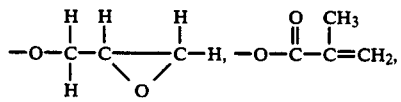

and so on. In particular, metal alcoholates are used preferably. Each of the aforementioned metal-organic compounds undergoes hydrolysis and polycondensation upon heating to a low temperature, and, when heated to a higher temperature in the aforementioned range while the mold is pressed against the substrate in an atmosphere at a pressure of 0.0133 Pa or below, the metal-organic compound is set up speedily in a shape determined by the shapes of the substrate surface and the mold surface.

The metal-organic compound, used either singly or in combination of two or more, is mixed with water or an organic solvent (e.g., alcohol), the thickener and, if necessary, a hydrolysis catalyst, e.g. acid or alkali, to form a coating solution.

The thickener used in the present invention increases the viscosity of the solution containing the metal-organic compound, thereby facilitating the formation of the coating film in a predetermined thickness on the substrate, and maintains the coating film in a suitable viscous state at a reduced pressure and room temperature, thereby ensuring easy formation of a minute rough pattern. As the thickener in the present invention, polymeric substances which are soluble in water and in organic solvents can be used. In particular, chain polyethers such as polyethylene glycol, polytetramethylene ether glycol, etc. can be used preferably.

The amount of the thickener added to the coating solution is preferably from about 0.25 to about 1.8 times the weight of the oxide to be formed from the coating solution. When the amount of the thickener is less than about 0.25 times the weight of the oxide, the coating film will be set up so rapidly, upon pressure reduction, as to make it difficult to form the desired pattern with good dimensional accuracy. When the amount of the thickener is more than about 1.8 times the weight of the oxide, on the other hand, the coating film will be excessively soft, with the undesirable result of larger defects arising from residual gases or of misshaping.

It is preferable that the step of pressing the mold against the coating film on the substrate according to the present invention is started from an arbitrary end and proceeds toward other portions. When the pressing is carried out by such a method, gases present in the gap between the mold and the substrate due to the surface tension of the sol-gel film are expelled from the gap, so that generation of bubbles in the coating film is less liable to occur. The preferable method of pressing may be accomplished, for example, by deforming a mold made of a low-stiffness material, such as an organic material, into a spherical, cylindrical or other convex surface shape, bringing the mold and the substrate into contact with each other, and then releasing the mold from the deformation.

In the present invention, the pressure with which to press the mold against the coating film on the substrate is preferably 9.8 $N/cm^2$ or above, more preferably 50 $N/cm^2$ or above, in order for the volume of the residual gases to be smaller.

The substrate to be used in the present invention is preferably a glass plate, in view of optical and mechanical properties. Among others, those glass plates containing alkali metal ions, such as sodium ions, potassium ions, etc. and capable of being strengthened chemically are particularly preferred.

The mold may be formed of a metal, a glass, a resin or the like. For attaining a higher dimensional accuracy, in particular, glass or resin molds made by the 2P (Photo-Polymer) process, resin molds made by injection molding, and resin molds made by casting can be used preferably. As the minute pattern of the mold, a variety of patterns are applicable. For instance, minute patterns with a groove width of about 1 μm and a groove depth in the range from 50 to 200 nm, which can be used as a guide groove of an optical disk substrate for information recording, are applicable as the minute pattern of the mold. Rough patterns (namely, projected and recessed patterns) of several hundreds of nanometers in size, which can be employed as a diffraction grating or a grating lens for optical use, are also applicable.

According to the present invention, formation of a pattern in the surface of the coating film on the substrate is carried out by pressing the mold against the coating film in an atmosphere of a reduced pressure, so that no bubbles are caused or permitted to be present between the coating film and the mold. Therefore, the surface of the coating film is free of hollows formed due to the presence of bubbles.

In the step of pressing the mold against the substrate according to the present invention, any gas present in the gap between the mold and the substrate is expelled from the gap by the surface tension of the sol-gel film, and bubbles are rarely generated in the coating film on the substrate.

The thickener contained in the coating solution used in the present invention prevents the coating film formed on the substrate from sudden or too rapid setup in the reduced-pressure atmosphere, and thereby makes the coating film retain appropriate softness.

The setup of the coating film, with the mold pressed against the film in a reduced-pressure atmosphere, according to the present invention is carried out by heating to a temperature at which the polycondensation or cross-linking reaction of the metal-organic compound is accelerated. It is thereby possible to set up the coating film speedily.

The present invention will now be explained with reference to examples below.

FIG. 1 is an illustration of a procedure for carrying out the present invention. A coating film 2 is formed on a glass substrate 1. Then, while the coating film 2 is heated in an atmosphere of a reduced pressure, a mold 3 is pressed against the coating film 2. Alternatively, the mold 3 may be pressed against the coating film 2, before heating the coating film 2 for a predetermined period of time. Thereafter, the mold 3 is separated from the coating film 2. The glass substrate with the coating film thereon having a rough pattern formed in its surface is baked at a high temperature, whereby a grooved glass disk substrate 5 is obtained.

EXAMPLE 1

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, which is the silicon dioxide to be obtained upon converting all of silicon compound in the solution into silicon dioxide by hydrolysis and polycondensation of $(PEG)/(SiO_2)=1.0$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.0133 Pa. In the vacuum chamber, the mold was pressed against the coating film on the glass substrate with a pressure of 50 $N/cm^2$ and, in this condition, heating was carried out at 100° C. for 10 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.2 μm thick, glass-like grooved film 4.

When the surface of the grooved glass disk substrate 5 produced as above was observed under a scanning electron microscope, it was found that a good groove shape with a groove depth of about 0.1 μm, a groove width of about 0.7 μm and a groove pitch of about 1.6 μm was obtained over the entire surface area intended. There were observed very few surface defects arising from penetration of bubbles.

EXAMPLE 2

Silicon tetraethoxide in a weighed amount of 0.05 mol was admixed with, on molar basis, 4 times its amount of ethanol and 4 times its amount of water (containing 3% by weight of HCl), and the resultant admixture was stirred at about 50° C. for 1 hour. To the solution thus obtained, a solution of 0.01 mol of titanium tetra-n-butoxide in ethanol was added slowly, and stirring at about 50° C. was further carried out for 30 minutes. The solution thus obtained was diluted with twice its volume of ethanol. To the diluted solution, a polyethylene glycol (PEG) with an average molecular weight of 600 was added in a weight ratio to $(SiO_2+TiO_2)$, which is the silicon dioxide to be obtained upon converting all of silicon compound in the solution into silicon dioxide by hydrolysis and polycondensation of $(PEG)/(SiO_2+TiO_2)=1.0$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press device was set to 0.0133 pa. In the vacuum chamber, the mold was pressed against the coating film on the glass substrate with a pressure of 9.8 $N/cm^2$ and, in this condition, heating was carried out at 100° C. for 10 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.2 μm thick, glass-like grooved film 4.

When the surface of the grooved glass disk substrate 5 produced as above was observed under a scanning electron microscope, it was found that a good groove shape with a groove depth of about 0.1 μm, a groove width of about 0.7 μm and a groove pitch of about 1.6 μm was obtained over the entire surface area intended. There were observed very few surface defects arising from penetration of bubbles.

EXAMPLE 3

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of (PEG)/($SiO_2$)=1.0. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm and 0.7 μm in width at a ridge pitch of 1.6 μm in height and 0.7 μm in width at a ridge pitch of 1.6 μm over an annular area ranging from 25 mm radius to 60 mm radius. The pressure inside a vacuum chamber of the press device was set to 0.0133 Pa. In the vacuum chamber, the mold was pressed against the coating film on the glass substrate with a pressure of 50 N/cm² and, in this condition, heating was carried out at 50° C. for 30 minutes to set up the coating film. The vacuum chamber was returned to the atmospheric pressure, and the mold was separated from the coating film. The glass substrate with the coating film set up thereon was then subjected to baking in the atmospheric air at 300° C. for 10 minutes, to evaporate off ethanol, the thickener, water, etc. substantially completely. By the above processing, the coating film 3 was converted to an about 0.2 μm thick, glass-like grooved film 4.

When the surface of the grooved glass disk substrate 5 produced as above was observed under a scanning electron microscope, it was found that a good groove shape with a groove depth of about 0.1 μm, a groove width of about 0.7 μm and a groove pitch of about 1.6 μm was obtained over the entire surface area intended. There were observed very few surface defects arising from penetration of bubbles.

EXAMPLE 4

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of (PEG)/($SiO_2$)=1.0. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press device was set to 0.00133 Pa. In the vacuum chamber, the mold was pressed against the coating film on the glass substrate with a pressure of 9.8 N/cm² and, in this condition, heating was carried out at 80° C. for 10 minutes to set up the coating film. The vacuum chamber was returned to the atmospheric pressure, and the coating film was separated from the mold. The glass substrate with the coating film set up thereon was then subjected to baking in the atmospheric air at 300° C. for 10 minutes, to evaporate off ethanol, the thickener, water, etc. substantially completely. By the above processing, the coating film 3 was converted to an about 0.2 μm thick, glass-like grooved film 4.

When the surface of the grooved glass disk substrate 5 produced as above was observed under a scanning electron microscope, it was found that a good groove shape with a groove depth of about 0.1 μm, a groove width of about 0.7 μm and a groove pitch of about 1.6 μm was obtained over the entire surface area intended. There were not observed any surface defects arising from penetration of bubbles.

EXAMPLE 5

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. The solution thus obtained was diluted with twice its volume of ethanol. To the diluted solution, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of (PEG)/($SiO_2$)=1.0. The polyethylene glycol was dissolved uniformly in the solution, and the resultant solution was used as a coating solution.

Figure 2:
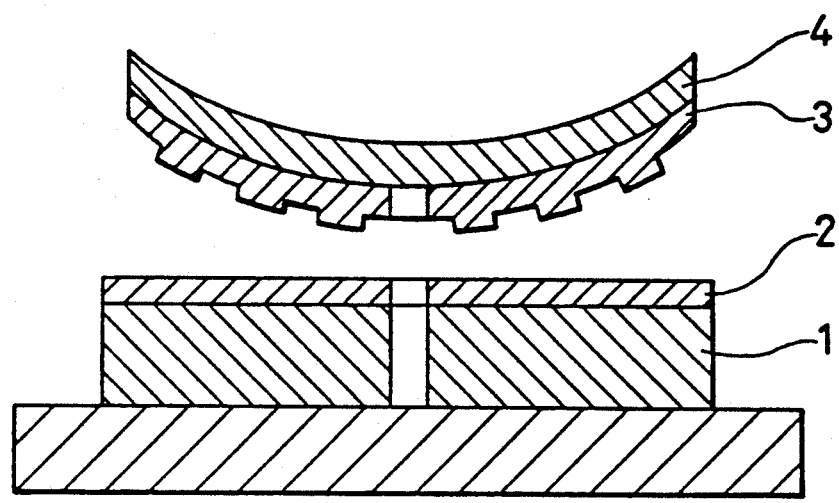
FIG. 2 is a sectional view showing schematically one preferred pressing step according to the present invention as described in Example 5.

A chemically strengthened glass having an outside diameter of 130 mm and a thickness of 1.2 mm was dipped in the coating solution, and then slowly pulled up out of the solution to form a coating film 2 on the substrate. Next, as shown in FIG. 2, a polycarbonate mold 3, which was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius, and the glass substrate with the coating film thereon faced to the polycarbonate mold 3 were placed in a metallic mold, together with a silicone rubber plate 4 with 130 mm outside diameter and 5 mm thickness disposed on the mold 3 on the opposite side of the glass substrate. After fixation of peripheral portions of the polycarbonate mold 3, a central portion of the mold 3 was pushed about 2 to 3 mm toward the glass substrate, whereby the mold 3 was deformed into a substantially spherical surface shape convexed to the side of the glass substrate. The mold in this deformed state was slowly pressed against the glass substrate, starting from a central portion of the substrate. Then, the mold 3 was further pressed against the glass substrate with gradual relaxation of the deformation, so that the area of pressing was gradually broadened radially outwards in an axisymmetrical manner, resulting finally in that the mold 3 was pressed against the entire surface area of the disk.

Subsequently, the assembly in this condition was heated up to 100° C., at which heating was continued for 10 minutes, followed by releasing the glass substrate from the polycarbonate mold 3 and baking the glass substrate at 400° C. for 10 minutes. By the baking operation, the coating film on the glass substrate was converted, through evaporating-off of ethanol, water, etc., into an about 0.2 μm thick, glass-like grooved film 4.

When the surface of the grooved glass disk produced as above was observed under a polarization microscope, it was found that a good groove shape with a groove depth of about 0.1 μm, a groove width of about 0.7 m and a groove pitch of about 1.6 μm was obtained over the entire surface area intended. There were observed very few surface defects arising from penetration of bubbles.

EXAMPLE 6

Silicon tetraethoxide in a weighed amount of 0.05 mol was admixed with, on molar basis, 4 times its amount of ethanol and 4 times its amount of water (containing 3% by weight of HCl), and the resultant admixture was stirred at about 50° C. for 30 minutes. To the solution thus obtained, a solution of 0.01 mol of titanium tetra-n-butoxide in ethanol was added slowly, and stirring at about 50° C. was further carried out for 30 minutes. The solution thus obtained was diluted with twice its volume of ethanol To the diluted solution, a polyethylene glycol (PEG) with an average molecular weight of 600 was added in a weight ratio to ($SiO_2 + TiO_2$), the silicon dioxide to be obtained upon converting all of silicon compound in the solution into silicon dioxide by hydrolysis and polycondensation of $(PEG)/(SiO_2) + (TiO_2) = 1.0$. The polyethylene glycol was dissolved uniformly in the solution, and the resultant solution was used as a coating solution.

The procedure of Example 4 was repeated in the same manner except for using the coating solution obtained above, to form a grooved glass disk.

When the surface of the grooved glass disk produced in this example observed under a polarization microscope in the same manner as in Example 4, it was found that a good groove shape with a groove depth of about 0.1 μm, a groove width of about 0.7 μm and a groove pitch of about 1.6 μm was obtained over the entire surface area intended, as in Example 4. There were observed very few surface defects arising from penetration of bubbles.

EXAMPLE 7

Figure 3:
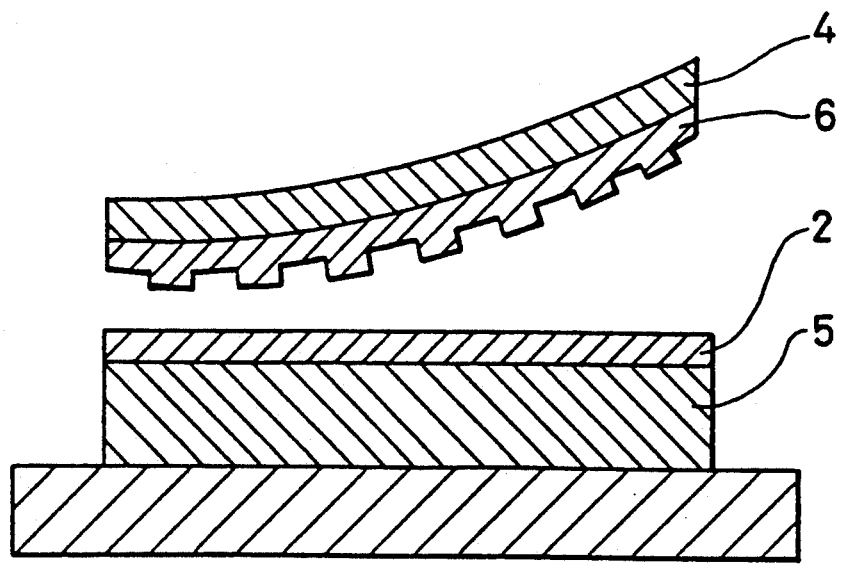
FIG. 3 is a sectional view showing schematically another preferred pressing step of the present invention as described in Example 7.

A substrate 5 made of a chemically strengthened glass and having dimensions of 100 mm × 150 mm × 1 mm was dipped in the coating solution prepared in Example 3, and slowly pulled up out of the solution to form a coating film 2 on the substrate. Next, as shown in FIG. 3, a polycarbonate mold 6, which had dimensions of 100 mm × 150 mm × 1.2 mm and was provided in height and 0.7 μm in width at a ridge pitch of 1.6 μm, and the glass substrate with the coating film thereon faced to the polycarbonate mold 6 were placed in a metallic mold, together with a silicone rubber plate 4 having dimensions of 100 mm × 150 mm × 5 mm and being disposed on the mold 3 on the opposite side of the glass substrate.

Then, the mold was wrapped around a cylindrical base member, to deform the mold into a cylindrical shape convexed to the side of the glass substrate. The mold in this deformed state was slowly pressed against the glass substrate, starting from an end portion. Then, the area of pressing was broadened in one direction gradually by releasing the mold 6 in the pressing area from the cylindrical base member, to finally press the mold 6 against the entire surface area of the glass substrate.

Subsequently, the assembly in this condition was heated up to 100° C., at which heating was continued for 10 minutes, followed by releasing the glass substrate from the polycarbonate mold and baking the glass substrate at 400° C. for 10 minutes. By the baking operation, the coating film on the glass substrate was converted, through evaporating-off of ethanol, water, etc., into an about 0.2 μm thick, glass-like grooved film 4.

When the surface of the grooved glass disk produced as above was observed under a polarization microscope, it was found that a good groove shape with a groove depth of about 0.36 μm, a groove width of about 0.7 μm and a groove pitch of about 1.6 μm was obtained over the entire surface area intended. There were observed very few surface defects arising from penetration of bubbles.

COMPARATIVE EXAMPLE 1

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of $(PEG)/(SiO_2) = 1.0$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.133 Pa. In the vacuum chamber, the mold was pressed against the coating film on the glass substrate with a pressure of 50 N/cm² and, in this condition, heating was carried out at 100° C. for 10 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.2 μm thick, glass-like grooved film 4.

When the surface of the grooved glass disk substrate 5 produced as above was observed under a scanning electron microscope, it was found that although a good groove shape with a groove depth of about 0.1 μm, a groove width of about 0.7 μm and a groove pitch of about 1.6 μm was obtained over the entire surface area intended, hollows arising from residual gases were also formed over the entire substrate surface.

COMPARATIVE EXAMPLE 2

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis of polycondensation of $(PEG)/(SiO_2)=1.0$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.0133 Pa. In the vacuum chamber, the mold was pressed against the coating film on the glass substrate with a pressure of 50 $N/cm^2$ at room temperature (25° C.), without any heating, for 30 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.2 μm thick, glass-like grooved film 4.

The surface of the grooved glass disk substrate 5 produced as above was observed under a scanning electron microscope. Although very few surface defects arising from penetration of bubbles were observed, the formation of a groove over the entire surface area intended, with high dimensional accuracy and without irregularities, was not achieved. The unsatisfactory result was probably due to the insufficient duration of pressing the mold against the coating film for setting up the coating film. In other words, the result suggested that a long time is necessary for setting up the coating film at room temperature in a reduced-pressure atmosphere.

As is seen from the above, according to the present invention, an optical disk substrate having an extremely small number of minute defects in the surface thereof can be produced, with the setup period for a coating film shortened.

EXAMPLE 8

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 25° C. for 30 minutes. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of $(PEG)/(SiO_2)=0.625$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.0133 Pa. In the vacuum chamber, the mold was pressed against the coating film on the glass substrate with a pressure of 50 $N/cm^2$ and, with this pressing maintained, heat treatments were carried out under various temperature and time conditions, to set up the coating film. The vacuum chamber was returned to the atmospheric pressure, and the mold was separated from the coating film. The glass substrate with the coating film set up thereon was then subjected to baking in the atmospheric air at 350° C. for 10 minutes, to evaporate off ethanol, the thickener, water, etc. substantially completely. The surfaces of the specimens thus produced were observed under a scanning electron microscope. The results are shown in FIG. 4.

Figure 4:
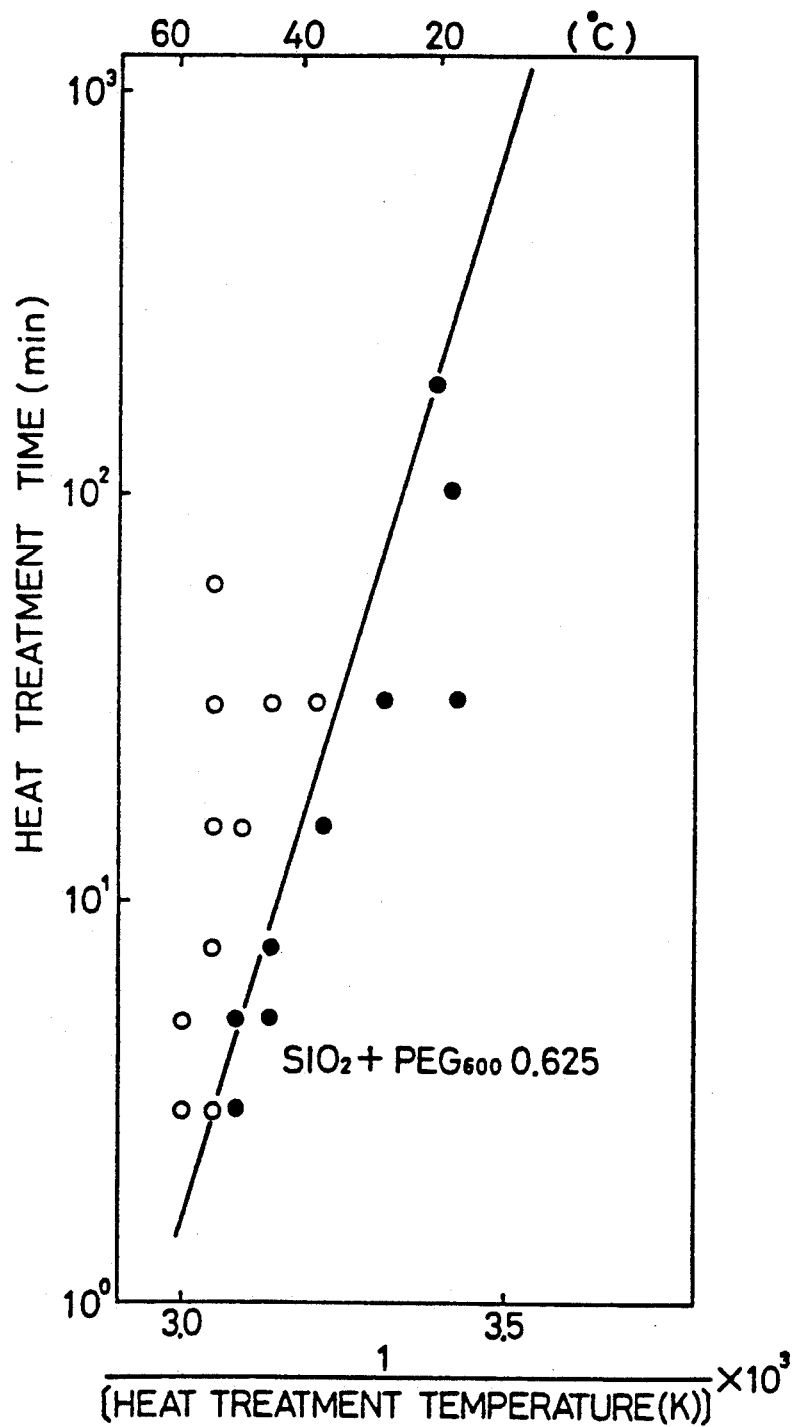
FIG. 4 is a diagram showing the results of a scanning electron microscopic observation of the surface of a minute-patterned substrate produced by the process of the present invention as described in Example 8.

When the surfaces of the grooved glass disk substrates produced as above were observed under a scanning electron microscope, the specimens denoted by void circles (○) in FIG. 4 had a good groove shape with a groove depth of about 0.1 μm, a groove width of about 0.7 μm and a groove pitch of about 1.6 μm formed over the entire surface area intended, and had very few surface defects arising from penetration of bubbles. On the other hand, the specimens denoted by solid circles (●) in FIG. 4 had failed to be provided with a groove, with high dimensional accuracy and without irregularities, over the entire surface area thereof, although the specimens had very few surface defects arising from penetration of bubbles. This was presumably because, in the specimens represented by the solid circles (●), setup of the coating film under the heat treatment conditions was insufficient and, therefore, distortion was caused in the groove transferred upon the release of the mold.

The results shown in FIG. 4 indicate that an optical disk substrate having a good groove shape can be obtained by setting up a coating film under the heat treatment temperature and time conditions in the region on the upper side of the straight line drawn in the diagram.

EXAMPLE 9

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of $(PEG)/(SiO_2)=0.25$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.0133 Pa. In the vacuum chamber, the mold was pressed against the coating film on the glass substrate with a pressure of 50 $N/cm^2$ and, in this condition, heating was carried out at 100° C. for 10 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.15 μm thick, glass-like grooved film 4.

When the surface of the grooved glass disk substrate 5 produced as above was observed under a scanning electron microscope, it was found that a good groove shape with a groove depth of about 0.12 μm, a groove width of about 0.7 μm and a groove pitch of about 1.6 μm was obtained over the entire surface area intended. There were observed very few surface defects arising from penetration of bubbles.

EXAMPLE 10

Silicon tetraethoxide in a weighed amount of 0.05 mol was admixed with, on molar basis, 5 times its amount of ethanol and 6 times its amount of water (containing 3% by weight of HCl), and the resultant admixture was stirred at about 50° C. for 1 hour. To the solution thus obtained, a polyethylene glycol (PEG) having an average molecular weight of 600 was added in a weight ratio to $SiO_2$, the silicon dioxide to be obtained upon converting all of silicon compound in the solution into silicon dioxide by hydrolysis and polycondensation of $(PEG)/(SiO_2)=1.8$. The polyethylene glycol was dissolved uniformly in the solution, and the resultant solution was used as a coating solution.

The coating solution was applied to a chemically strengthened glass substrate 1 having an outside diameter of 130 mm and a thickness of 1.2 mm, by the spin coating technique to form a coating film 2 in a thickness of 0.3 μm. The glass substrate with the coating film thereon was then placed in a vacuum press equipment having a heater, together with a polycarbonate mold 3. The mold 3 was 130 mm in outside diameter and 1.2 mm in thickness and provided with a spiral ridge portion 0.14 μm in height and 0.7 μm in width at a ridge pitch of 1.6 μm over an annular area ranging from 25 mm radius to 60 mm radius. The pressure inside a vacuum chamber of the press equipment was set to 0.0133 Pa. In the vacuum chamber, the mold was pressed against the coating film on the glass substrate with a pressure of 50 $N/cm^2$ and, in this condition, heating was carried out at 100° C. for 10 minutes to set up the coating film. The vacuum chamber was returned to the atmospheric pressure, and the mold was separated from the coating film. The glass substrate with the coating film set up thereon was then subjected to baking in the atmospheric air at 400° C. for 10 minutes, to evaporate off ethanol, the thickener, water, etc. substantially completely. By the above processing, the coating film 3 was converted to an about 0.3 μm thick, glass-like grooved film 4.

When the surface of the grooved glass disk substrate 5 produced as above was observed under a scanning electron microscope, it was found that a good groove shape with a groove depth of about 0.07 μm, a groove width of about 0.7 μm and a groove pitch of about 1.6 μm was obtained over the entire surface area intended. There were observed very few surface defects arising from penetration of bubbles.

What is claimed is:

1. A process for producing a minute-patterned substrate comprising the steps of
   forming a coating film of a solution containing a metal-organic compound and a thickener on a substrate,
   pressing a mold against the coating film on the substrate in an atmosphere of a pressure of 0.0133 Pa or below,
   initiating heating of the coating film subsequent to initiation of pressing of the mold against the coating film on the substrate,
   heating the coating film to a temperature of from 40° to 250° C. to set up the coating film, the heating carried out while still pressing the mold. against the coating film in an atmosphere of a pressure of 0.0133 Pa or below.
   separating the mold from the coating film thus set up, and
   baking the set coating film on the substrate at a temperature of 300° C. or above.

2. The process as set forth in claim 1, wherein the pressing of the mold against the coating film on the substrate is started from an arbitrary end and proceeds toward other portions.

3. The process as set forth in claim 1, wherein the substrate and the mold are of disklike shape, and the pressing of the mold against the coating film on the substrate is started from a central portion of the disklike shapes of the mold and the substrate and proceeds radially outwards in an axisymmetrical manner.

4. The process as set forth in claim 1, wherein the amount of the thickener in the solution is from 0.25 to 1.8 times the weight of an oxide to be formed by the baking of the solution.

5. The process as set forth in claim 1, wherein the thickener is a chain polyether.

6. The process as set forth in claim 1, wherein the pressing is carried out with a pressure of 9.8 $N/cm^2$ or above.

* * * * *